United States Patent [19]

Ado et al.

[11] 4,233,283
[45] Nov. 11, 1980

[54] METHOD FOR MANUFACTURE OF IRON OXIDE FLAKES

[75] Inventors: Kazuaki Ado, Sakai; Soichiro Nobuoka, Toyonaka; Takashi Asai, Minoo, all of Japan

[73] Assignee: Agency of Industrial Science & Technology, Ministry of International Trade & Industry, Tokyo, Japan

[21] Appl. No.: 21,241

[22] Filed: Mar. 15, 1979

[30] Foreign Application Priority Data

May 20, 1978 [JP] Japan .................................. 53-60193

[51] Int. Cl.³ ............................................. C01G 49/06
[52] U.S. Cl. ..................................... 423/633; 23/300; 23/305 F; 106/304; 423/266; 423/275
[58] Field of Search ........................ 423/633, 266, 275; 106/304; 23/300, 305 F

[56] References Cited

U.S. PATENT DOCUMENTS

| | | | |
|---|---|---|---|
| 2,989,411 | 6/1961 | Suchow | 106/304 X |
| 3,087,829 | 4/1963 | Linton | 106/304 X |
| 3,382,174 | 5/1968 | Hund | 106/304 X |

FOREIGN PATENT DOCUMENTS 2056042  5/1971  Fed. Rep. of Germany ........... 423/633

*Primary Examiner*—Jack Cooper
*Attorney, Agent, or Firm*—Kurt Kelman

[57] ABSTRACT

In the manufacture of iron oxide flakes by the steps of mixing an aqueous ferric salt solution with an aqueous alkali solution for thereby inducing an amorphous precipitate and subjecting the precipitate to a hydrothermal treatment, iron oxide flakes of an increased flake size are obtained by adding boric acid or a salt thereof to the mixture prior to the step of hydrothermal treatment.

4 Claims, 1 Drawing Figure

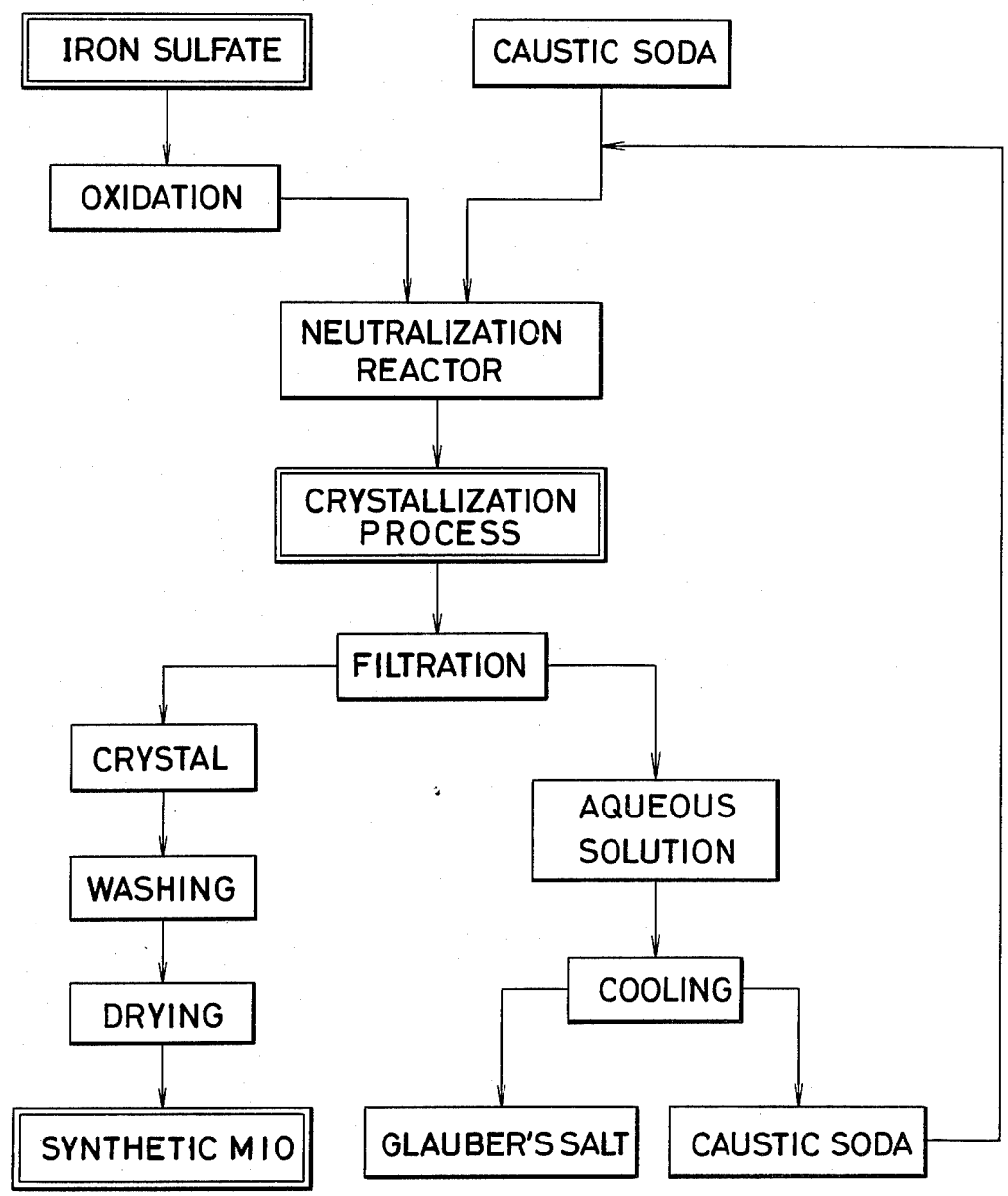

METHOD FOR MANUFACTURE OF IRON OXIDE FLAKES

BACKGROUND OF THE INVENTION

This invention relates to an improved method for the manufacture by a simple yet highly efficient procedure of iron oxide flakes, particularly α-iron oxide flakes of a large size otherwise known as micaceous iron oxide (hereinafter referred to as MIO) which manifests an outstanding corrosion-proofing effect when used as a pigment in heavy-duty corrosion-proofing paints.

MIO paints have found widespread acceptance for use in corrosion-proofing iron and steel materials. In Europe, MIO paints have enjoyed popular use since nearly a century ago. As a pigmental component, these MIO paints contain micaceous iron oxide in high concentrations. MIO means naturally occurring micaceous, scaly or flakelike crystals of $\alpha\text{-}Fe_2O_3$. These natural MIO's contain about 15% by weight of silica sand, alumina and other impurities. They occur Austria, Germany, the United Kingdom, etc. Among these, particularly excellent both qualitatively and quantitatively are the MIO produced in Austria. In coats formed of MIO paints, the thin flakes of $\alpha\text{-}Fe_2O_3$ are arranged in a stratal form throughout the coats of paints so as to intercept ultraviolet rays and obstruct moisture and gases. When they are used as overcoats or intermediate coats, therefore, they protect their respective undercoats and extend the service life of the substrates. This means that the thin flakes of iron oxide which are arranged in a stratal form in the coats are particularly effective in protecting the substrates from corrosion. MIO paints have found widespread utility in applications to virtually all sorts of steel materials which are used in bridges, electric poles, tanks and other structures including even the famous Eiffel Tower in Paris. In Japan, MIO paints began to appear on the market about a decade ago. They have so far been used for coating giant bridges such as the Kammon Bridge and the Great Kobe Bridge. MIO paints have been designated for use on bridges to be constructed across the Seto Inland Sea. Since the estimated deposits of natural MIO of high quality in Europe are not very large, it is uncertain whether a stable supply of MIO will be available in future years.

In view of this uncertainty, the inventors continued a study in search for a method for synthetic production of MIO and achieved good results. Some of the inventions which have issued from their study are enumerated below.

Examples of inventions relating to methods for manufacture are:

Japanese Patent Publication (hereinafter abbreviated as J.P.P.) SHO No. 43(1968)-12435, claiming: "A method for the manufacture of α-iron oxide, which comprises dispersing an α-iron (III) hydroxide oxide or basic iron (III) salt in an aqueous alkali solution and subjecting the resultant dispersion to a hydrothermal treatment at temperatures of not less than 250° C.".

J.P.P. SHO No. 45(1970)-54, claiming: "A method for the manufacture of MIO, which comprises compression molding iron (III) hydroxide oxide or basic iron (III) salt into highly packed tablets, placing the tablets in the aqueous solution of an alkali and an alkaline earth metal hydroxide, and subjecting the resultant mixture to a hydrothermal treatment."

J.P.P. SHO No. 48(1973)-29718 (corresponding to U.S. Pat. No. 3,987,156, B.P. No. 1,333,789 and French Patent No. 7,040,844), claiming: "A method for the manufacture of MIO and sodium sulfate, which comprises producing a hydrate paste of iron (III) and an alkali from a thick aqueous solution of iron (III) and a hydrated strong alkali solution, and subjecting this hydrate paste to a hydrothermal treatment in an excess alkali solution."

J.P.P. SHO No. 49(1974)-44878, claiming: "A method for the manufacture of MIO by the steps of dispersion iron (III) hydroxide in an aqueous alkali solution and subjecting the resultant dispersion to a hydrothermal treatment, which method is characterized by using iron (III) hydroxide which is produced by adding an aqueous iron (III) salt solution to an aqueous alkali solution." Examples of inventions relating to applied techniques are:

J.P.P. SHO No. 50(1975)-24156, claiming: "A method for the manufacture of a ferromagnetic oxide material, which comprises subjecting iron (III) hydroxide oxide, basic iron (III) salt, iron (III) hydroxide and amorphous iron (III) hydroxide to a hydrothermal treatment in an aqueous alkali solution to produce MIO, mixing this MIO with other metal salt or metal hydroxide and burning the resultant mixture."

J.P.P. SHO No. 51(1976)-10261, claiming: "A resinous composition for the manufacture of reinforced molded articles of resin, comprising a synthetic resin and MIO contained in a dispersed state in the synthetic resin."

The method the inventors previously developed for the manufacture of the synthetic MIO comprises the steps of preparing iron hydroxide, for example, from an iron salt and subjecting the iron hydroxide to a hydrothermal treatment in an aqueous alkali solution for producing crystalline iron oxide flakes. In this case, the spent pickling solution issuing from the secondary iron and steel industry, the by-produced iron sulfate issuing from the titanium oxide industry or some other spent iron salt can effectively be utilized as the iron salt. Thus, the above method, aside from producing an useful substance, serves the dual purpose of preventing environmental pollution by industrial effluents and reclaiming otherwise wasted resources. A typical process in which the above method is practiced by using the by-produced iron sulfate from the titanium oxide industry is illustrated in the accompanying drawing.

In this process, a divalent iron sulfate is oxidized into a trivalent iron sulfate and this trivalent iron sulfate is neutralized with caustic soda to induce an amorphous precipitate formed preponderantly of iron hydroxide. Then, the amorphous precipitate is placed in an autoclave and subjected therein to a hydrothermal treatment. This hydrothermal treatment produces crystalline MIO and a mother liquid which is a mixed aqueous solution containing caustic soda and sodium sulfate. The crystalline MIO is separated from the mother liquid (aqueous solution) through filtration. The crystals thus separated are washed with water, dried and thereafter perpared as the final product. The mother liquid is sent to a Glauber's salt plant, where it is cooled to give rise to Glauber's salt crystals. The caustic soda solution which consequently occurs is put to reuse.

The synthetic MIO produced as described above is compared with natural MIO with respect to main properties in Table 1.

TABLE 1

Synthetic MIO and natural MIO

| Item | Synthetic MIO | Natural MIO |
| --- | --- | --- |
| Purity | Not less than 98% | 80 to 85% |
| Shape of particles | Thin hexagonal plates | Preponderantly flaky particles |
| Particle size distribution | Fairly uniform | Not uniform |
| Size ratio* | About 1:10–30 | Too ununiform to permit measurement |
| Particle diameter** | 2 to 60 μ | Too irregular to permit measurement |
| Adjustment of particle size | Feasible (2 to 60 μ) | Not feasible (crushing results in loss of shape) |
| Water-soluble content | 0.005 to 0.015% | 0.340 to 0.473% |
| Absorption spectrum | Wavelengths of not more than 560 mμ absorbed | — |
| Thermal resistance | Crystals retained intact up 1100° C. | Crystals disintegrate at 800° C. |
| Resistance to acids and alkalis | Not affected by 1.0N sulfuric acid | — |
| Resistance to acids and alkalis | Not affected by strong alkali | — |

*Ratio of thickness to length of plate
**Length of plate

Paints comprising synthetic MIO are superior to paints comprising natural MIO in many points.

It is clear from Table 1 that synthetic MIO is decidedly superior to natural MIO in appearance and physical constants. Since the surface of the minute flakes of the synthetic MIO is very smooth, the crystalline surface reflects incident light and shines brilliantly and, therefore, assumes a beautiful appearance. The sparkling effect of the flakes is particularly pleasant in the case of giant MIO crystals more than 30 microns in size. In contrast, the particles of the natural MIO contain more impurities than the synthetic MIO, possess no definite shape and vary greatly in particle size. Thus, the natural MIO gleams dully. The flake surface of the thin single crystal of the synthetic MIO corresponds to the surface perpendicular (0001) to the axis C of the hexagonal system. In the absorption spectrum of the crystal of the synthetic MIO, all the short wavelength rays of not more than 560 mμ are absorbed. This fact explains why the synthetic MIO crystals arranged in a stratal form in a coat of MIO paint provides perfect interception to harmful ultraviolet rays. Thus, the MIO paints enjoy high weatherability over a long period of time. Besides, the synthetic MIO exhibits outstanding thermal stability and offers high resistance to acids and alkalis and is suitable for use as a pigment in the range of from pH 8.0 to pH 8.7.

Thus, there has been developed a synthetic MIO which far excels the natural countertype in numerous respects. The effect of the MIO paint manifested in its corrosion-proofing activity increases in proportion as the flake surface of the thin single crystals of MIO increases. A need has been felt, accordingly, for the development of a method capable of producing large MIO particles. Methods so far developed for the manufacture of such large MIO particles may be roughly grouped as follows:

(1) Methods (such as is disclosed by J.P.P SHO No. 45(1970)-54) which comprise the steps of compression molding α-iron (III) hydroxide oxide and subjecting the molded particles to a hydrothermal treatment.

(2) Methods (such as is disclosed by J.P.P. SHO No. 48(1973)-29718) which involve increasing the alkali concentration of the mother liquid for the hydrothermal treatment.

(3) Methods (such as is disclosed by J.P.P. SHO No. 49(1974)-44878) which adopt a reverse neutralization technique for the preparation of iron hydroxide precipitate.

(4) Methods which involve using suitable amounts of seed crystals in the hydrothermal treatment of iron hydroxide.

By a suitable combination of methods described above, large MIO particles up to about 60 microns of particle diameter can be prepared in a laboratory,. No technique has yet been developed for commercial production of large MIO particles exceeding 30 microns in particle diameter.

An object of the present invention is to provide a method for the manufacture of large MIO particles by a commercial operation.

SUMMARY OF THE INVENTION

To accomplish the object described above according to the present invention, there is provided a method for the manufacture of large MIO particles by the steps of mixing an aqueous ferric salt solution with an aqueous alkali solution for thereby inducing an amorphous precipitate containing iron hydroxide or basic iron salt and subjecting the amorphous precipitate to a hydrothermal treatment for producing a synthetic MIO, which method comprises adding boric acid or a salt thereof to the reaction system prior to the step of hydrothermal treatment.

The method of the present invention permits very easily manufacture of MIO particles of a large size. The synthetic MIO thus produced, when used as a pigmental component in heavy-duty corrosion-proofing paints, permit the paints to manifest a greatly enhance effect in corrosion-proofing the substrates coated therewith.

The other objects and characteristic features of the present invention will become apparent from a detailed description of the invention to be given herein below.

BRIEF EXPLANATION OF THE DRAWING

The accompanying drawing is a flow sheet showing a typical known procedure for the manufacture of a synthetic MIO.

DESCRIPTION OF THE PREFERRED EMBODIMENT

The additive which is used in the method of this invention is generally selected from the group consisting of boric acids and salts thereof. Preferred examples include $H_3BO_3$, $B_2O_3$, $Na_2B_4O_7$ and $Na_2B_2O_7 \cdot 10H_2O$. The additive manifests its effect particularly conspicuously when the amount of the additive is not more than 10% by weight based on the ferric salt, the raw material, computed as an anhydride. Generally, the additive is used in an amount of not less than 0.1% by weight. The effect of its addition is better when the amount falls in the range of from 1 to 6% by weight. The addition of boric acid or its salt serves its purpose advantageously insofar as it takes place prior to the step of hydrothermal treatment. The question as to what particular point this addition should be made is not critical. The boric acid or salt thereof can be effectively added to the aqueous ferric salt solution, to the aqueous alkali solution or to the amorphous precipitate resulting from the mixture of the two solutions mentioned above.

From the practical point of view, ferric sulfate is a preferred example of ferric salts and an aqueous sodium hydroxide solution and an aqueous sodium carbonate solution are preferred examples of aqueous alkali solutions. The aqueous alkali solution is added in such an amount to the aqueous ferric salt solution that the amorphous precipitate which occurs in consequence of the mixture of the two solutions will still contain unreacted alkali therein. Optimum conditions for the hydrothermal reaction may be suitably selected, depending upon the amount of the additive thus used. The hydrothermal reaction can be carried out generally by heating the mixture in an autoclave. Practically, the heating conditions involved in the hydrothermal treatment are 150° to 200° C. or so of temperatures and 5 to 15 kg/cm² or so of pressure, though the limits are not critical.

As described above, the addition of a small amount of the aforementioned additive permits manufacture of large synthetic MIO particles 30 to 100 microns in particle diameter measured in the longitudinal direction of particle. The effect of the additive is quite conspicuous. In the hydrothermal treatment, the additive plays a part like that of a catalyst or mineralizer capable of facilitating the phenomenon of crystallization. Thus, the synthetic MIO of this invention contains substantially no residue of the additive.

Now, the method for performing a coating test on paints containing the large MIO particles and the results of this test will be described below.

In the paints used in this test, five kinds of synthetic MIO's having different particle diameters of 5, 30, 50, 70 and 90 microns were used. As controls, paints containing commercially available iron oxide red (Grade 1) and natural MIO produced in Austria were used. Paints were prepared from the seven samples and were applied on test panels specified by JIS with a brush as indicated in Table 2.

TABLE 2

| | Thickness of coat (microns) | Number of applications | Kind of paint |
|---|---|---|---|
| First layer | 100 × 1 | 1 | Vinylex 120, active primer (K-5633) |
| Second layer | 100 × 2 | 2 | Cyanamide helgon primer, red tust |
| Third layer | 80 × 2 | 2 | (K-5625) Test specimen* |

*Each test specimen comprised 50% by weight of MIO or equivalent and the balance to make up 100% by weight of an alkyd type vehicle. Each test panel of steel sheet had a back seal of tar-epoxy coat.

The coats thus formed on the test panels were tested for corrosion-proofness. The items of test were physical properties, salt spray, water resistance, salt water resistance, accelerated exposure and natural exposure. The paints were separately exposed to weather for 1000 hours (accelerated exposure) in a Weather-O-meter and subsequently subjected to Erichsen test, impact test, cross cut test and discoloration test. The results are shown in Table 3. Other samples were subjected to test for resistance to water and salt water after exposure. The results are shown in Table 4.

TABLE 3

| | | Results of coat tests performed after exposure (1000 hours) in Weather-O-meter | | | | | | |
|---|---|---|---|---|---|---|---|---|
| | Particle diameter | Erichsen test | | Impact test (10 mm Diam, 500 g) | | Cross cut test | | Discoloration test |
| Sample | (microns) | 3 mm | 5 mm | 30 cm | 50 cm | 2 mm × 200 | | |
| SMO-6 | 5 | ⊗ | x | ○ | — | ◎ | " | Slightly bleached |
| SMO-5 | 30 | ⊗ | x | ◎ | ○ | ◎ | " | Slightly bleached |
| SMO-4 | 50 | ○ | x | ◎ | ◎ | ◎ | " | Slightly bleached |
| SMO-2 | 70 | ○ | x | ◎ | ◎ | ◎ | " | Slightly bleached |
| SMO-1 | 90 | ○ | x | ◎ | ◎ | ◎ | " | Slightly bleached |
| Iron oxide red | — | x | x | ○ | — | ◎ | " | Slightly bleached |
| Natural MIO | Ununiform | ⊗ | x | ◎ | ◎ | ◎ | " | Slightly bleached |

◎ stands for perfect freedom from abnormality.
○ stands for occurrence of cracks to a point where the tight adhesion of paint to the panel surface is not appreciably affected.
x stands for occurrence of peeling of coat from the panel surface.

TABLE 4

| | Results of test for resistance to water and salt water | | | | | | | |
|---|---|---|---|---|---|---|---|---|
| | Immersion in water (days) | | | | Immersion in salt water* (days) | | | |
| Sample | 7 | 30 | 60 | 100 | 7 | 30 | 60 | 100 |
| SMO-6 | ◎ | ○ | △ | x | ◎ | ◎ | ◎ | ◎ |
| SMO-5 | ◎ | ○ | △ | △ | ◎ | ◎ | ◎ | ◎ |
| SMO-4 | ◎ | ○ | △ | △ | ◎ | ◎ | ◎ | ○ |
| SMO-2 | ◎ | ◎ | ◎ | ◎ | ◎ | ◎ | ◎ | ◎ |
| SMO-1 | ◎ | ◎ | ◎ | ◎ | ◎ | ◎ | ◎ | ◎ |
| Iron oxide red | ◎ | x | x | x | ◎ | x | x | x |
| Natural MIO | ◎ | ◎ | △ | x | ◎ | ◎ | ◎ | ◎ |

The results were rated by the scale, wherein:
◎ stands for complete absence of swelling.
○ stands for occurrence of very slight swelling.
△ stands for occurrence of fair swelling.
x stands for occurrence of heavy swelling.
* The salt water was an aqueous 3% NaCl solution.

From the results of tests given above, it is seen that paints using synthetic MIO particles having particle sizes from 30 to 90 microns, particularly from 50 microns upward, gave advantageous results in all items of test. The results clearly indicate that synthetic MIO's having particle diameters from 30 microns upward are highly suitable for use as pigments in heavy-duty corrosion-proofing paints.

To be more specific, the degree of orientation of MIO cyrstals in a coat of paint increases in proportion as the flake surface of MIO crystals increases. The effect of the applied coat to intercept ultraviolet rays and obstruct moisture and gases, therefore, increases with the increasing flake surface of MIO crystals. For the actual use of heavy-duty corrosion-proofing paints of MIO, the particle diameters of synthetic MIO crystals are desired to fall in the range of from 30 to 80 microns in due consideration of the diameter of the spray gun nozzle and the ease of the work involved.

Where the synthetic MIO is used as a filler for resin with a view to esthetically improving the resin and enhancing the resin's mechanical strength and weatherability (as disclosed by J.P.P. SHO No. 51(1976)-10261), the effect of the addition increases with the increasing particle diameter of the MIO crystals. The synthetic MIO crystals emit a metallic sparkling effect when their particle diameter exceeds the level of about 30 microns. The brightness of this sparkle increases with the increasing particle diameter of the crystals. Where the metallic sparkle of the MIO crystals is aimed at esthetically improving the resin, the crystals emit a truly wonderful sparkling effect when their particle diameters range from 100 to 200 microns. MIO crystals of such greater particle diameters are expected to find utility in new applications to decorative articles.

Now the method of this invention will be described with reference to working examples.

EXAMPLE 1

Copper as ($FeSO_4 \cdot 7H_2O$) was used as the starting material. It was dissolved in water. To the resultant solution, sulfuric acid was added and, further, an aqueous sodium chlorate solution was added as an oxidizing agent to oxidize the iron (II) to iron (III). Then, boric acid was added. The proportions in which the aforementioned compounds were used are shown below. The final mixture was diluted with water to a total volume of 800 ml.

| | |
|---|---|
| $FeSO_4 \cdot 7H_2O$ | 500 g |
| concH$_2$SO$_4$ | 30 ml |
| NaClO$_3$ | 35 g |
| H$_3$BO$_3$ | 11 g |

In this case, nitric acid could be used as an oxidizing agent. The boric acid was added in the amount of 11 g, which corresponded to 3% based on the anhydrous iron sulfate ($Fe_2(SO_4)_3$). Separately an aqueous solution was prepared by adding 700 ml of water to 640 g of sodium hydroxide. This aqueous solution was mixed with the aforementioned aqueous ferric salt solution to produce an amorphous precipitate containing iron hydroxide. At this point, the total volume of the precipitate was 2 liters. In the amorphous precipitate, the sodium hydroxide was present in an excess concentration of 7 N stoichiometrically. When this precipitate was placed in an autoclave and subjected therein to a hydrothermal treatment at 180° C. under 11 atmospheres for one hour, the precipitate converted to a synthetic MIO (thin iron oxide flake like crystals) and a mother liquid containing sodium sulfate. The crystals were washed with water, separated by filtration and dried and then prepared as a final product. Thus about 140 g of synthetic MIO was obtained (compared with a theoretical yield of 143.5 g). The average particle diameter measured in the longitudinal direction of flake surface was 51 microns. When the same procedure was repeated without using boric acid, the average particle diameter of MIO crystals was 30 microns.

Synthetic MIO's were manufactured by following the procedure described above while using boric acid in a fixed amount of 11 g (3%) and varying the amount of sodium hydroxide so as to have the concentration of the excess sodium hydroxide in the amorphous precipitate range from 0.5 to 19 N. The particle diameters of the produced MIO crystals were as shown in Table 5. For the purpose of comparison, the table also shows the results of MIO crystals obtained by the reverse neutralization method (J.P.P. SHO No. 49(1974)-44878).

TABLE 5

Effect of additive on particle diameter

| Concentration of excess NaOH (N) in amorphous precipitate | Average particle diameter (microns) of synthetic MIO crystals in the longitudinal direction of flake face | |
|---|---|---|
| | Reverse neutralization method | Method of this invention |
| 0.5 | 7 | 12 |
| 1 | 9 | 14 |
| 2 | 12 | 19 |
| 3 | 15 | 25 |
| 4 | 19 | 30 |
| 5 | 22 | 34 |
| 6 | 26 | 42 |
| 7 | 30 | 51 |
| 8 | 32 | 56 |
| 9 | 36 | 65 |
| 10 | 39 | 73 |
| 11 | 42 | 82 |
| 12 | 45 | 90 |
| 13 | 47 | 101 |
| 14 | 50 | 110 |
| 15 | — | 118 |
| 16 | 53 | 125 |
| 17 | — | 136 |
| 18 | — | 143 |
| 19 | — | 150 |

It is evident from Table 5 that synthetic MIO crystals of large particle diameters are readily produced by addition of boric acid. The same effect is obtained by using diboron trioxide, sodium tetraborate or borax was used as the additive. The addition of a small amount of boric acid or a borate accelerates the crystallization of synthetic MIO and facilitates manufacture of MIO crystals of large particle diameters.

EXAMPLE 2

Synthetic MIO's were manufactured by following the procedure of Example 1 while fixing the concentration of the excess sodium hydroxide in the amorphous precipitate at 7 N and varying the amount of boric acid based on ferric sulfate. The MIO crystals thus produced were tested for particle diameter in the longitudinal direction of the flake face. The results are shown in Table 6.

TABLE 6

Relation between amount of boric acid added and particle diameter of produced MIO crystals

| Amount of H$_3$BO$_3$ added (%) | Average particle diameter (microns) of synthetic MIO crystals in the longitudinal direction of flake face |
|---|---|
| 0 | 30 |
| 0.5 | 40 |

TABLE 6-continued
Relation between amount of boric acid added and particle diameter of produced MIO crystals

| Amount of $H_3BO_3$ added (%) | Average particle diameter (microns) of synthetic MIO crystals in the longitudinal direction of flake face |
|---|---|
| 1.0 | 45 |
| 1.5 | 48 |
| 2.0 | 50 |
| 2.5 | 51 |
| 3.0 | 51 |
| 3.5 | 51 |
| 4.0 | 50 |
| 5.0 | 48 |
| 6.0 | 45 |
| 7.0 | 42 |
| 8.0 | 38 |
| 9.0 | 35 |
| 10.0 | 32 |
| 11.0 | 29 |

It is learnt from Table 6 that where no boric acid is added, the produced MIO crystals have a particle diameter of 30 microns, that the particle diameter of produced MIO crystals increases as the amount of boric acid added increases, that the particle diameter reaches the maximum when the amount of added boric acid ranges from 2.5 to 3.5%, that the particle diameter decreases as the amount of added boric acid further increases, that no effect of addition is obtained when the amount of added boric acid reaches 10%, and that the added boric acid produces a negative effect when its amount exceeds 11%. The effect of the addition of boric acid is conspicuous when the amount ranges from 1.0 to 6.0%. Although the effect of the addition of boric acid is affected by the concentration of the excess sodium hydroxide in the mother liquid, the operation and effect of the addition of boric acid is conspicuous whenever the amount of added boric acid does not exceed 10%. This effect of the amount of the additive is the same when diboron trioxide, sodium tetraborate or borax is used as the additive.

What is claimed is:

1. In a method for the manufacture of micaceous α-iron oxide by the steps of mixing an aqueous ferric salt solution with an aqueous alkali solution thereby producing an amorphous precipitate and subjecting the precipitate to a hydrothermal treatment at a temperature of more than 150° C. under pressure of more than 5 kg/cm$^2$, the improvement which comprises the step of adding boric acid or a salt thereof in an amount of 0.1 to 10% by weight, based on the ferric salt computed as an anhydride, prior to the hydrothermal treatment.

2. The method according to claim 1, wherein boric acid or a salt thereof is added to the aqueous ferric salt solution.

3. The method according to claim 1, wherein boric acid or a salt thereof is added to the aqueous alkali solution.

4. The method according to claim 1, wherein boric acid or a salt thereof is added to the amorphous precipitate.

* * * * *